(12) United States Patent
Hassan

(10) Patent No.: US 11,738,403 B2
(45) Date of Patent: Aug. 29, 2023

(54) PUSH PULL TORCH

(71) Applicant: The ESAB Group Inc., Florence, SC (US)

(72) Inventor: Khalid Hassan, Denton, TX (US)

(73) Assignee: THE ESAB GROUP INC., Florence, SC (US)

( * ) Notice: Subject to any disclaimer, the term of this patent is extended or adjusted under 35 U.S.C. 154(b) by 512 days.

(21) Appl. No.: 16/773,182

(22) Filed: Jan. 27, 2020

(65) Prior Publication Data
US 2021/0229205 A1    Jul. 29, 2021

(51) Int. Cl.
| B23K 9/133 | (2006.01) |
|---|---|
| B23K 9/12 | (2006.01) |
| B23K 9/16 | (2006.01) |
| B23K 9/173 | (2006.01) |

(52) U.S. Cl.
CPC .............. *B23K 9/133* (2013.01); *B23K 9/125* (2013.01); *B23K 9/164* (2013.01); *B23K 9/173* (2013.01)

(58) Field of Classification Search
CPC ........ B23K 9/133; B23K 9/125; B23K 9/164; B23K 9/173; B23K 9/124; B23K 9/1336; B23K 9/122; B65H 51/10; B65H 59/22
See application file for complete search history.

(56) References Cited

U.S. PATENT DOCUMENTS

| 3,196,249 | A | * | 7/1965 | Thostrup | ................ | B23K 9/295 |
|---|---|---|---|---|---|---|
| | | | | | | 219/137.9 |
| 4,426,046 | A | | 1/1984 | Heuckroth | | |
| 4,954,690 | A | | 9/1990 | Kensrue | | |
| 5,132,513 | A | | 7/1992 | Ingwersen et al. | | |
| 5,248,868 | A | | 9/1993 | Cusick, III | | |
| D346,390 | S | | 4/1994 | Sperling et al. | | |
| 5,338,917 | A | | 8/1994 | Stuart et al. | | |
| 5,378,870 | A | | 1/1995 | Krupnicki | | |
| 5,595,671 | A | | 1/1997 | David | | |
| 5,728,995 | A | | 3/1998 | Kensrue | | |
| 6,066,835 | A | | 5/2000 | Hanks | | |

(Continued)

FOREIGN PATENT DOCUMENTS

| CN | 103903684 A | 7/2014 |
|---|---|---|
| CN | 204946560 U | 1/2016 |

(Continued)

*Primary Examiner* — John J Norton
*Assistant Examiner* — Franklin Jefferson Wang
(74) *Attorney, Agent, or Firm* — Edell, Shapiro & Finnan, LLC

(57) ABSTRACT

A push-pull welding torch is disclosed. The welding torch includes a torch body and a unitary block disposed in the torch body. The unitary block includes an inlet channel, an outlet channel, and a gas channel fluidly connected to the inlet channel and the outlet channel. The inlet and outlet channels may receive a weld filler material. A quick release tensioner assembly is disclosed for a welding torch that may include a swing arm configured to mount to a drive block assembly via a pivot, a lever disposed between the swing arm and block assembly when the quick release tensioner assembly is mounted to the drive block assembly, a fastener disposed through the swing arm and lever, and a resilient member disposed between the fastener and swing arm. The fastener may be configured to engage the drive block when the quick release assembly is mounted to the drive block.

20 Claims, 10 Drawing Sheets

(56) References Cited

U.S. PATENT DOCUMENTS

| | | | |
|---|---|---|---|
| 6,225,599 B1 | 5/2001 | Altekruse | |
| 6,399,913 B1 | 6/2002 | Sammons et al. | |
| 6,568,578 B1 * | 5/2003 | Kensrue | B23K 9/1336 226/176 |
| 6,610,963 B2 | 8/2003 | Zamuner | |
| D489,079 S | 4/2004 | Horner-Richardson et al. | |
| 6,786,752 B1 | 9/2004 | Kerekes et al. | |
| 6,940,041 B2 | 9/2005 | Zamuner | |
| 6,998,575 B1 | 2/2006 | Kensrue | |
| 7,038,168 B2 | 5/2006 | Kensrue et al. | |
| D532,432 S | 11/2006 | Owens | |
| 7,135,655 B2 | 11/2006 | Tomiyasu et al. | |
| D537,092 S | 2/2007 | Owens | |
| 7,238,918 B2 | 7/2007 | Matiash | |
| 7,241,972 B2 | 7/2007 | Kensrue | |
| 7,244,909 B2 | 7/2007 | Kensrue et al. | |
| 7,271,366 B2 | 9/2007 | Kensrue | |
| 7,274,001 B1 | 9/2007 | Cusick, III | |
| 7,285,746 B2 | 10/2007 | Matiash | |
| 7,300,277 B2 | 11/2007 | Foos et al. | |
| 7,342,199 B2 | 3/2008 | Zamuner | |
| 7,374,074 B2 | 5/2008 | Matiash | |
| 7,389,900 B2 | 6/2008 | Matiash | |
| 7,446,280 B2 | 11/2008 | Zamuner | |
| 7,511,245 B2 | 3/2009 | Hsu | |
| 7,723,644 B2 | 5/2010 | Christopher et al. | |
| 7,767,934 B2 | 8/2010 | Christopher et al. | |
| D647,382 S | 10/2011 | Flattinger et al. | |
| D661,964 S | 6/2012 | Pangborn | |
| 8,269,143 B2 | 9/2012 | Christopher et al. | |
| D672,378 S | 12/2012 | Boyer | |
| 8,389,899 B2 | 3/2013 | Natta | |
| D683,372 S | 5/2013 | Boyer | |
| D683,773 S | 6/2013 | Boyer | |
| 8,642,922 B2 | 2/2014 | Flattinger et al. | |
| 8,772,668 B2 | 7/2014 | Leiteritz et al. | |
| 8,796,587 B2 | 8/2014 | Kachline | |
| 9,024,235 B2 | 5/2015 | Fuerlinger et al. | |
| 9,040,872 B2 | 5/2015 | Anzengruber et al. | |
| D735,002 S | 7/2015 | Bondy et al. | |
| 9,073,139 B2 * | 7/2015 | Christopher | B23K 9/1336 |
| 9,102,001 B2 | 8/2015 | Basit | |
| 9,114,483 B2 | 8/2015 | Enyedy | |
| 9,162,312 B2 | 10/2015 | Ma et al. | |
| 9,186,746 B2 | 11/2015 | Cossette et al. | |
| 9,199,329 B2 | 12/2015 | Kettunen | |
| 9,314,868 B2 | 4/2016 | Fuerlinger et al. | |
| 9,463,524 B2 | 10/2016 | Garvey | |
| 9,486,873 B2 | 11/2016 | Kleppen et al. | |
| 9,586,283 B2 * | 3/2017 | Romenesko | B65H 59/225 |
| 9,610,647 B2 | 4/2017 | Soringauer et al. | |
| 9,643,278 B2 | 5/2017 | Anzengruber et al. | |
| 9,717,168 B2 | 7/2017 | Inoue et al. | |
| 9,802,267 B2 | 10/2017 | Hung | |
| 10,024,473 B2 | 7/2018 | Bruckner et al. | |
| D838,301 S | 1/2019 | Prikler et al. | |
| 10,239,148 B2 | 3/2019 | Garvey | |
| D844,405 S | 4/2019 | Shen | |
| 2005/0016976 A1 * | 1/2005 | Belfiore | B23K 9/124 219/137.2 |
| 2006/0278623 A1 * | 12/2006 | Christopher | B23K 9/1336 219/137.7 |
| 2006/0278626 A1 | 12/2006 | Christopher et al. | |
| 2007/0012672 A1 | 1/2007 | Inoue et al. | |
| 2009/0242535 A1 * | 10/2009 | Minato | B23K 9/133 219/137.31 |
| 2009/0277891 A1 | 11/2009 | Krupnicki | |
| 2012/0211479 A1 * | 8/2012 | Anderson | B23K 9/173 219/136 |
| 2013/0334190 A1 * | 12/2013 | Garvey | B23K 9/1336 219/137.7 |
| 2014/0110386 A1 | 4/2014 | Centner | |
| 2014/0263252 A1 * | 9/2014 | Sadowski | B23K 9/1336 219/137.42 |
| 2015/0014284 A1 | 1/2015 | Burvelle et al. | |
| 2016/0016266 A1 | 1/2016 | Bellile et al. | |
| 2016/0129522 A1 * | 5/2016 | Evans | B23K 9/12 219/137.7 |
| 2017/0021443 A1 | 1/2017 | Garvey | |
| 2017/0151622 A1 | 6/2017 | Dessart et al. | |
| 2017/0182582 A1 | 6/2017 | Daniels et al. | |
| 2018/0001413 A1 * | 1/2018 | Fujii | B23K 9/173 |
| 2018/0133829 A1 | 5/2018 | Raloff | |
| 2018/0229326 A1 | 8/2018 | Gagnon | |
| 2019/0018285 A1 | 4/2019 | Ma et al. | |

FOREIGN PATENT DOCUMENTS

| | | | |
|---|---|---|---|
| CN | 206105126 U | 4/2017 | |
| CN | 207503667 U | 6/2018 | |
| CN | 207676672 U | 7/2018 | |
| DE | 3010451 A1 | 9/1981 | |
| DE | 202010014600 U | 1/2011 | |
| KR | 20100108726 A | 10/2010 | |
| KR | 20110087513 A | 8/2011 | |
| WO | WO-2018221338 A1 * | 12/2018 | B23K 9/133 |

\* cited by examiner

PUSH PULL TORCH

FIELD OF INVENTION

The present invention relates to the field of a push-pull welding torch and, in particular, a unitary block disposed in a body of the welding torch.

INTRODUCTION

During a weld operation, a wire feeder may feed or push a weld filler material, e.g., a metal wire, to a welding torch through a cable, hose, or lead. The weld wire may be received by a pull mechanism disposed in the welding torch body. The pull mechanism facilitates translating the weld wire through the cable and torch body to a tip of the torch. The pull mechanism avoids jamming of the weld wire in the torch and/or cable, e.g. bird nesting. Conventional assemblies for pull mechanisms may include multiple blocks for supporting rollers of the pulling mechanism and guiding the wire towards the torch distal end. Additionally, conventional push-pull torches may further include one or more hoses or conduits for directing gas (e.g., shield gas and/or process gas) from the cable, around the pull mechanism, and to a conduit leading to the torch distal end.

In view of at least the aforementioned issues, an ergonomic push-pull welding torch with a quick release pull mechanism is desirable.

SUMMARY

The present invention relates to a push-pull welding torch. In accordance with at least one embodiment of the present invention, the welding torch includes a torch body and a unitary block disposed in the torch body. The unitary block includes an inlet channel, and an outlet channel, where the inlet and outlet channels are configured to receive a weld filler material. The unitary block further includes a gas channel fluidly connected to the inlet channel and the outlet channel.

According to another aspect, the welding torch includes a torch body, a unitary block disposed in the torch body, and a drive roller disposed at the unitary block. The unitary block includes an inlet channel, an outlet channel, and a gas channel fluidly connected to the inlet channel and the outlet channel. The inlet and outlet channels are configured to receive a weld filler material.

According to another aspect, the welding torch includes a torch body, a unitary block disposed in the torch body, and a drive roller and a tension roller disposed at the unitary block.

According to another aspect, the welding torch includes a torch body, a unitary block disposed in the torch body, a drive roller and a tension roller disposed at the unitary block, and a swing arm pivotally connected to the unitary block. The tension roller may be operatively coupled to the swing arm.

According to another aspect, the welding torch includes a torch body, a unitary block disposed in the torch body, a drive roller and a tension roller disposed at the unitary block, and a swing arm pivotally connected to the unitary block. The tension roller may be operatively coupled to the swing arm. A tension screw may be coupled to the swing arm and a release lever. The release lever may be movably coupled to the unitary block.

According to another aspect, the welding torch includes a torch body, a unitary block disposed in the torch body, a drive roller and a tension roller disposed at the unitary block, and a swing arm pivotally connected to the unitary block. The tension roller may be operatively coupled to the swing arm. A tension screw may be coupled to the swing arm and a release lever. The release lever may be movably coupled to the unitary block. A resilient member may be disposed between the tension screw and swing arm, where the resilient member is configured to apply a biasing force on the swing arm that biases the swing arm towards the unitary block.

According to another aspect, the welding torch includes a torch body, a unitary block disposed in the torch body, a drive roller and a tension roller disposed at the unitary block, and a swing arm pivotally connected to the unitary block. The tension roller may be operatively coupled to the swing arm. A tension screw may be coupled to the swing arm and a release lever. The release lever may be movably coupled to the unitary block. A resilient member may be disposed between the tension screw and swing arm, where the resilient member is configured to apply a biasing force on the swing arm that biases the swing arm towards the unitary block. The swing arm may be configured to apply a force through the tension roller to the weld filler material and the drive roller. The drive roller and tension roller may be configured to pull weld filler material through the inlet channel as they rotate.

According to another aspect, the welding torch includes a torch body and a unitary block disposed in the torch body. The unitary block includes an inlet channel and an outlet channel, where the inlet and outlet channels are configured to receive a weld filler material. The unitary block further includes a gas channel fluidly connected to the inlet channel and the outlet channel. The torch body may include a cable attachment portion that may be angled with respect to the unitary block.

According to another aspect, the welding torch includes a torch body and a unitary block disposed in the torch body. The unitary block includes an inlet channel and an outlet channel, where the inlet and outlet channels are configured to receive a weld filler material. The unitary block also includes a gas channel fluidly connected to the inlet channel and the outlet channel. The torch body may include a cable attachment portion that may be angled with respect to the unitary block. The cable attachment portion may comprise a ball and socket style joint configured to receive a cable.

According to another aspect, a quick release tensioner assembly for a welding torch may include a swing arm configured to mount to a drive block assembly via a pivot, a lever disposed between the swing arm and block assembly when the quick release tensioner assembly is mounted to the drive block assembly, a fastener disposed through the swing arm and lever, and a resilient member disposed between the fastener and swing arm. The fastener may be configured to engage the drive block when the quick release assembly is mounted to the drive block.

According to another aspect, a quick release tensioner assembly for a welding torch may include a swing arm configured to mount to a drive block assembly via a pivot, a lever disposed between the swing arm and block assembly when the quick release tensioner assembly is mounted to the drive block assembly, a fastener disposed through the swing arm and lever, and a resilient member disposed between the fastener and swing arm. The fastener may be configured to engage the drive block when the quick release assembly is mounted to the drive block. The resilient member may be configured to apply a biasing force to the swing arm that biases the swing arm towards the drive block assembly when the quick release assembly is mounted to the drive block assembly.

According to another aspect, a quick release tensioner assembly for a welding torch may include a swing arm configured to mount to a drive block assembly via a pivot, a lever disposed between the swing arm and block assembly when the quick release tensioner assembly is mounted to the drive block assembly, a fastener disposed through the swing arm and lever, a resilient member disposed between the fastener and swing arm, and a tension roller disposed on the swing arm. The fastener may be configured to engage the drive block when the quick release assembly is mounted to the drive block.

According to another aspect, a quick release tensioner assembly for a welding torch may include a swing arm configured to mount to a drive block assembly via a pivot, a lever disposed between the swing arm and block assembly when the quick release tensioner assembly is mounted to the drive block assembly, a fastener disposed through the swing arm and lever, a resilient member disposed between the fastener and swing arm, a tension roller disposed on the swing arm, and the drive block assembly. The fastener may be configured to engage the drive block when the quick release assembly is mounted to the drive block. The drive block assembly may include a drive roller. The tension roller may be biased towards the drive roller via the swing arm.

According to another aspect, a quick release tensioner assembly for a welding torch may include a swing arm configured to mount to a drive block assembly via a pivot, a lever disposed between the swing arm and block assembly when the quick release tensioner assembly is mounted to the drive block assembly, a fastener disposed through the swing arm and lever, a resilient member disposed between the fastener and swing arm, a tension roller disposed on the swing arm, and the drive block assembly. The fastener may be configured to engage the drive block when the quick release assembly is mounted to the drive block. The drive block assembly may include a drive roller. The tension roller may be biased towards the drive roller via the swing arm. The drive roller and tension roller may be configured to receive a weld filler material.

According to another aspect, a quick release tensioner assembly for a welding torch may include a swing arm configured to mount to a drive block assembly via a pivot, a lever disposed between the swing arm and block assembly when the quick release tensioner assembly is mounted to the drive block assembly, a fastener disposed through the swing arm and lever, and a resilient member disposed between the fastener and swing arm. The fastener may be configured to engage the drive block when the quick release assembly is mounted to the drive block. The resilient member may be a wave spring, coil spring, leaf spring, torsion spring, compression spring, or extension spring.

According to another aspect, a quick release tensioner assembly for a welding torch may include a swing arm configured to mount to a drive block assembly via a pivot, a lever disposed between the swing arm and block assembly when the quick release tensioner assembly is mounted to the drive block assembly, a fastener disposed through the swing arm and lever, and a resilient member disposed between the fastener and swing arm. The resilient member is configured to apply a biasing force to the swing arm that biases the swing arm towards the drive block assembly when the quick release assembly is mounted to the drive block assembly. The fastener may be configured to engage the drive block when the quick release assembly is mounted to the drive block, and may be configured to translate relative to the drive block assembly.

According to another aspect, a quick release tensioner assembly for a welding torch may include a swing arm configured to mount to a drive block assembly via a pivot, a lever disposed between the swing arm and block assembly when the quick release tensioner assembly is mounted to the drive block assembly, a fastener disposed through the swing arm and lever, and a resilient member disposed between the fastener and swing arm. The resilient member is configured to apply a biasing force to the swing arm that biases the swing arm towards the drive block assembly when the quick release assembly is mounted to the drive block assembly. The fastener may be configured to engage the drive block when the quick release assembly is mounted to the drive block, and may be configured to translate relative to the drive block assembly. Moving the fastener adjusts the amount of force applied by the resilient member to the swing arm.

According to another aspect, a quick release tensioner assembly for a welding torch may include a swing arm configured to mount to a drive block assembly via a pivot, a lever disposed between the swing arm and block assembly when the quick release tensioner assembly is mounted to the drive block assembly, a fastener disposed through the swing arm and lever, and a resilient member disposed between the fastener and swing arm. The resilient member is configured to apply a biasing force to the swing arm to bias the swing arm towards the drive block assembly when the quick release assembly is mounted to the drive block assembly. The fastener may be configured to engage the drive block when the quick release assembly is mounted to the drive block, and may be configured to translate relative to the drive block assembly. The lever may be configured to overcome the biasing force applied by the resilient member in response to the lever being pressed towards the block assembly.

According to another aspect, a quick release tensioner assembly for a welding torch may include a swing arm configured to mount to a drive block assembly via a pivot, a lever disposed between the swing arm and block assembly when the quick release tensioner assembly is mounted to the drive block assembly, a fastener disposed through the swing arm and lever, and a resilient member disposed between the fastener and swing arm. The resilient member is configured to apply a biasing force to the swing arm that biases the swing arm towards the drive block assembly when the quick release assembly is mounted to the drive block assembly. The fastener may be configured to engage the drive block when the quick release assembly is mounted to the drive block, and may be configured to translate relative to the drive block assembly. The lever may be configured to overcome the biasing force applied by the resilient member in response to the lever being pressed towards the block assembly. The swing arm may be configured to swing away from the drive block assembly about the pivot in response to the lever being pressed towards the block assembly.

According to another aspect, a quick release tensioner assembly for a welding torch may include a swing arm configured to mount to a drive block assembly via a pivot, a lever disposed between the swing arm and block assembly when the quick release tensioner assembly is mounted to the drive block assembly, a fastener disposed through the swing arm and lever, and a resilient member disposed between the fastener and swing arm. The fastener may be configured to engage the drive block when the quick release assembly is mounted to the drive block. The block assembly may be a unitary block.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures.

DETAILED DESCRIPTION

Figure 1:
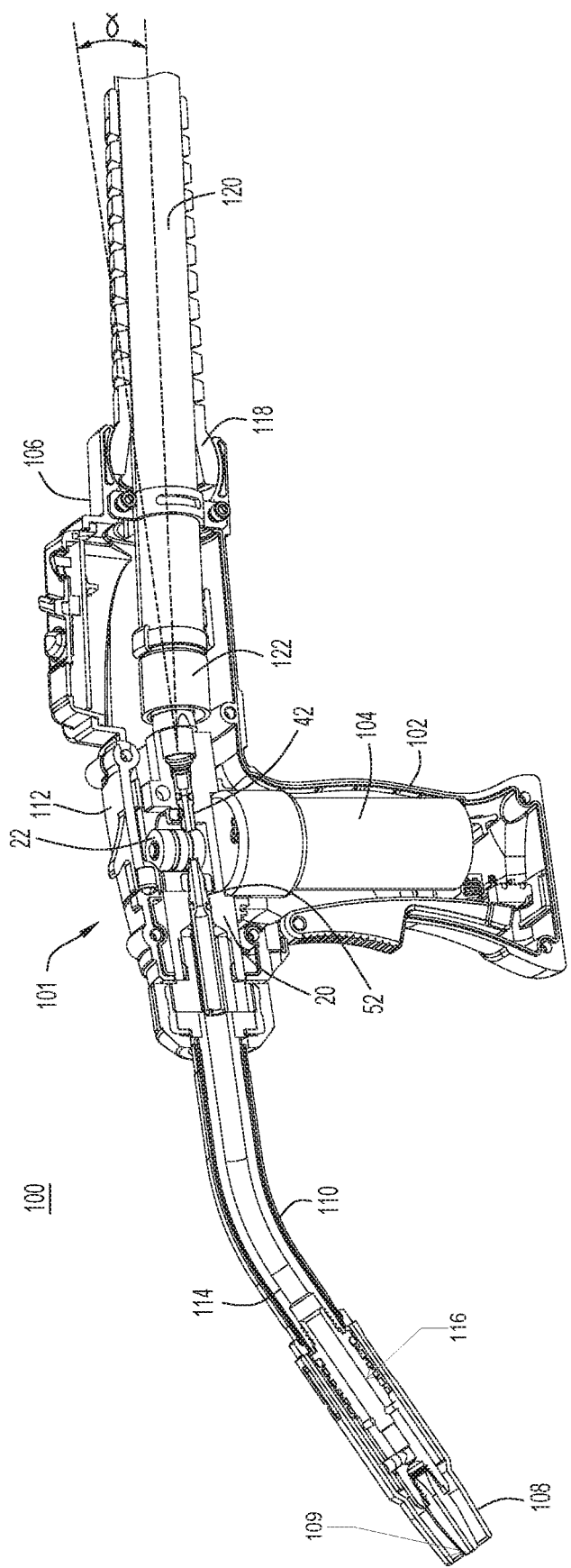
FIG. 1 is a perspective view of a cross-section of a hand-held push-pull torch, according to an exemplary embodiment.

The following description is not to be taken in a limiting sense but is given solely for the purpose of describing the broad principles of the invention. Embodiments of the invention will be described by way of example, with reference to the above-mentioned drawings showing elements and results according to the present invention.

Conventional push-pull welding torches include a complex pull mechanism disposed in the body of the torch. The pull mechanism may include an assembly of blocks. The blocks may include an inlet block for receiving weld wire and gas from a cable. The inlet block may divert the gas from the inlet block to one or more hoses. The inlet block may guide the wire to a feed block. The feed block may guide the wire to a drive block. A pair of rollers may be disposed in the drive block and may be configured to pull the wire from the feed block, through the drive block, and to an outlet block having a gas inlet. A sheath inlet may be received in the outlet block to receive the wire and extend through a torch neck to a torch head. The gas inlet receives the gas from the hose and discharges the gas between the sheath and torch neck. The blocks and hoses of the conventional pull mechanism may be fixed together through various fixing members (e.g., bolts, nuts, screws and/or clamps). The weight of the assembly of blocks, hoses, and fixing members of the pull mechanism may impact the ability of a user or welder to manipulate the conventional push-pull torch. Extended use of such push-pull welding torches may fatigue a user, thus impacting the quality of the weld and/or causing the user to take extended breaks from welding.

The complexity of the conventional assembly of the pull mechanism in push-pull weld torches further leads to difficulty in loading new wires and/or replacing drive rollers. For example, in order to load new wire into the conventional pull mechanism, portions of the pull mechanism assembly may be disassembled with a tool to remove a tension roller and/or drive roller. After the pull mechanism assembly is disassembled, a new wire or drive roller may be loaded into the pull mechanism. Using a tool, the pull mechanism may be reassembled with the new weld wire disposed between the drive roller and tension roller. The tension roller may then be biased towards the drive roller by adjusting a fixing member with the tool. Each time the user changes the drive roller the pull mechanism may be disassembled and reassembled. Further, each time the use loads weld filler material the tension roller must be readjusted to apply the desired force to the loaded weld wire and drive roller. Once the pull mechanism is reassembled with a weld wire loaded and the tension roller biased towards the drive roller, a user may commence welding.

Due to the multiple block assembly of conventional push-pull torches, loading and tensioning a wire into a conventional push-pull mechanism and/or changing a drive roller of the pull mechanism may be complicated. Multiple parts of the conventional pull mechanism may be removed to reload the push-pull torch with a new wire, and/or change out a worn drive roller with a new one. This process may take considerable time impacting overall welding efficiency. Additionally, the weight of conventional, push-pull torches due to the assembly of the pull mechanism and hoses disposed in the torch body may make the torch difficult to manipulate during a welding operation, thus impacting weld quality. Additionally, gaps between drive rollers and guide tubes may result in jamming or bird nesting of the weld filler material in the torch or cable.

Generally, a push-pull torch, as presented herein, includes a unitary block assembly with a quick release feature. The unitary block includes an inlet and a gas pathway for receiving the gas from the inlet. Weld filler material (e.g., weld wire) and gas may be delivered to the unitary block from a cable or hose. The inlet of the unitary block may receive the weld wire and gas. An inlet guide may be disposed in the inlet of the unitary block to guide the weld wire from the cable, through the block inlet and to a drive roller disposed at a central portion of the unitary block. The weld wire may be pulled through the inlet guide via a drive roller. An outlet guide may be disposed in an outlet portion of the unitary block and guides the weld wire from the drive roller to a sheath. The sheath may extend from the outlet guide through a torch neck to a torch head. The gas pathway bypasses the central portion occupied by the drive roller and is in fluid communication with the outlet. The outlet guide and sheath isolate the weld wire from the gas. The unitary block assembly, as described herein, may weigh less than conventional torches with pull mechanisms and may provide easier manipulation of the push-pull torch. Accordingly, user fatigue may decrease and weld quality may improve as compared to conventional push-pull torches.

In some implementations, the quick release feature provides tool-less disengagement of a tension roller from a drive roller allowing for quick reloading of weld wire and/or changing out of a worn drive roller. Once the torch is reloaded with new wire and/or drive roller, the tension roller may be quickly engaged with the drive roller and/or unitary block without adjusting a preset tension of the tension roller. A user may then commence with a welding operation. Accordingly, a user may save time during a reload operation.

In some implementations, an attachment portion of the torch may receive the cable via a joint, the attachment portion may be angled with respect to the torch housing. For example, the torch may have a body for receiving the pull mechanism. The attachment portion may extend from the torch body at an angle with respect to a longitudinal centerline of the torch body. The inclined connection between the cable and torch may relieve strain as compared to conventional torches having an attachment portion extending parallel to a longitudinal centerline of the torch body. Accordingly, user fatigue may further decrease and weld quality may improve as compared to conventional push-pull torches.

In some implementations, the joint connecting the angled attachment portion and cable may further include a ball and socket style joint. The ball and socket joint may minimize movement of a center of gravity of the torch while the torch is in use. Minimizing changes to the center of gravity of the torch may further reduce strain as compared to conventional torches having cable connections without moveable joints. Accordingly, user fatigue may further decrease and weld quality may improve as compared to conventional push-pull torches.

Now referring to FIG. 1, an exemplary embodiment of a torch is illustrated. The torch 100 includes a torch body 101 having a handle 102 and attachment portion 106. The torch may further include a torch neck 110 extending from the torch body 101 to a contact tip 109 disposed at the distal end of the neck 110. A drive block assembly 20 may be disposed within an interior of the torch body 101. A cable 120 may be coupled to the attachment portion 106 of the torch body 101. The cable 120 may extend through an interior of the attachment portion 106 to a proximal end of the drive block assembly 20. The cable may be configured to deliver weld filler material, e.g., metal weld wire, and a process gas to the torch 100. A drive roller 22 and tension roller 33 receive the weld filler material and cooperate to pull the weld filler material from the cable 120 and towards the contact tip 109. The drive roller 22 may have a groove for facilitating engagement with the weld filler material. A drive motor 104 may be connected to the drive roller and may drive the drive roller 22.

In some implementations, the cable 120 is coupled to the attachment portion 106 of the torch body 101 via a moveable joint 118. For example, the moveable joint 118 may be a ball and socket joint. The attachment portion may extend at an angle α from the torch body 101. For example, the angle α between the longitudinal axis of the torch body 101 and longitudinal axis of the attachment portion 106 may be between about 10° and 15°, and preferably 12°.

Drive Block

Figure 2:
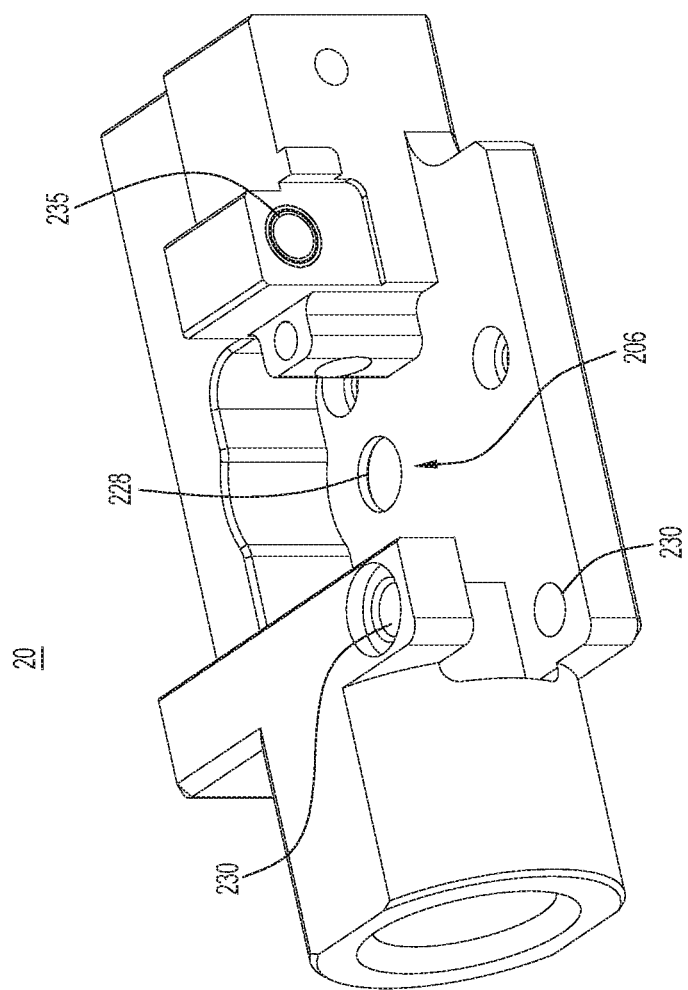
FIG. 2 is a perspective view of the drive block according to an exemplary embodiment.

Referring to FIG. 2, a drive block 200 is illustrated. The drive block may be a unitary block, or formed as an assembly of multiple independent blocks coupled together with fixing members (not shown). The unitary drive block 200 may be formed as a single, integral block, for example, by a 3D printing process, a sintering process, a milling process, a forging process, a casting process, and/or any other process. That is, the unitary drive block 200 is a single piece, not a plurality of pieces fixed together by fixing members, e.g., screws, nuts, bolts, etc. The drive block 200 may include pivot holes 230 for receiving a swing arm 32 of a quick release tensioner 30 (discuss below), and a through hole 228 for receiving a drive roller 22 and a rotor/spindle of the motor 102. In some implementations, the drive block 20 may include mounting holes for fixing the drive block 200 to the torch body 101.

In some implementations, the drive block 200 is formed from a metal. For example, the drive block 200 may be formed from aluminum, steel, brass, copper, titanium, nickel or any other metal or alloys.

Figure 3:
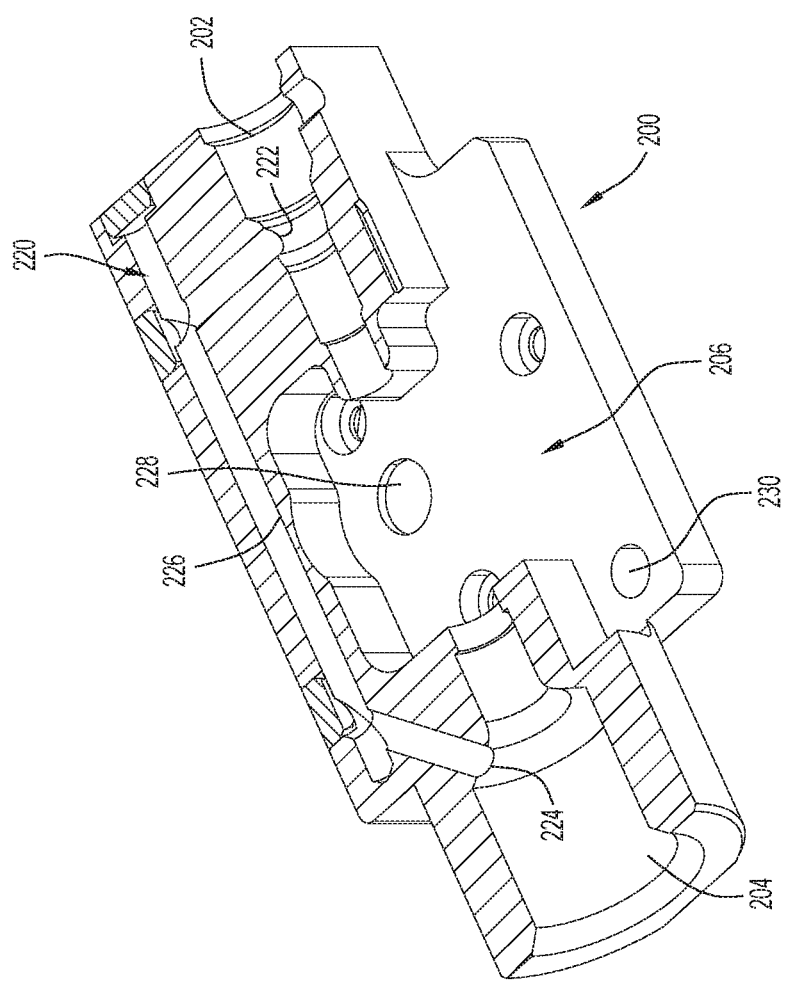
FIG. 3 is a cross-sectional view of the drive block according to an exemplary embodiment.

Referring to FIG. 3, a cross-section of the unitary drive block 200 is shown. The unitary drive block 200 may include an inlet 202, outlet 204, central portion 206, and gas passageway 220. The block inlet 202 may be configured receive a weld filler material and a flow gas from the cable 120. The block inlet 202 may be a variable-radius through hole extending from a proximal end of the drive block 200 along a longitudinal axis of the drive block 200 to the central portion 206 of the drive block 200. For example, the radius of the block inlet 202 may be greater at the proximal end of the drive block 200 than the radius at the central portion 206 of the drive block. The block outlet 204 may be configured receive a weld filler material from the central portion 206 and a flow gas from the gas passageway 220. The block outlet 204 may also be a variable-radius through hole extending from the central portion 206 of the drive block 200 along a longitudinal axis of the drive block 200 to a distal end of the drive block 200. For example, the radius of the block outlet 204 may be greater at the distal end of the drive block 200 than the radius at the central portion 206 of the drive block 200. The central portion 206 of the drive block 200 may be configured to receive the drive roller 22 and tension roller 33. The through hole 228 may be disposed in the central portion 206 of the drive block 200.

During operation, the weld filler material may exit from the cable 120 through the block inlet 202 to the drive roller 22 and tension roller 33 disposed in the central portion 206. The drive roller 22 and tension roller 33 may pull the weld filler material through the drive block 200. The weld filler material may exit the block outlet 204 and travel to the contact tip 109. The flow of gas may bypass the central portion 206 of the unitary drive block 200 by flowing through the gas passage way 220. For example, the flow of gas entering the block inlet 202 may enter the gas passageway 220 at channel inlet 222, flow through bypass channel 226 to channel outlet 224. The flow of gas may exit the block outlet 204 and flow to a torch nozzle 108 (illustrated in FIG. 1). That is, the gas may flow through the block 200 separate from the central portion 206 and elements disposed in the central portion 206, e.g., weld filler material, drive roller 22, tension roller 33, etc.

In some implementations, the gas passageway 220 may be formed by drilling. For example, the inlet channel 222, the outlet channel 224, and the bypass channel 226 may be drilled from an external surface of the drive block 200 to a desired depth. External holes formed by the drilling may be plugged. For example, plugs may be press-fit into the openings of the channel at the surface of the drive block 200, thereby sealing the gas passageway 220 from the ambient environment.

Figure 4:
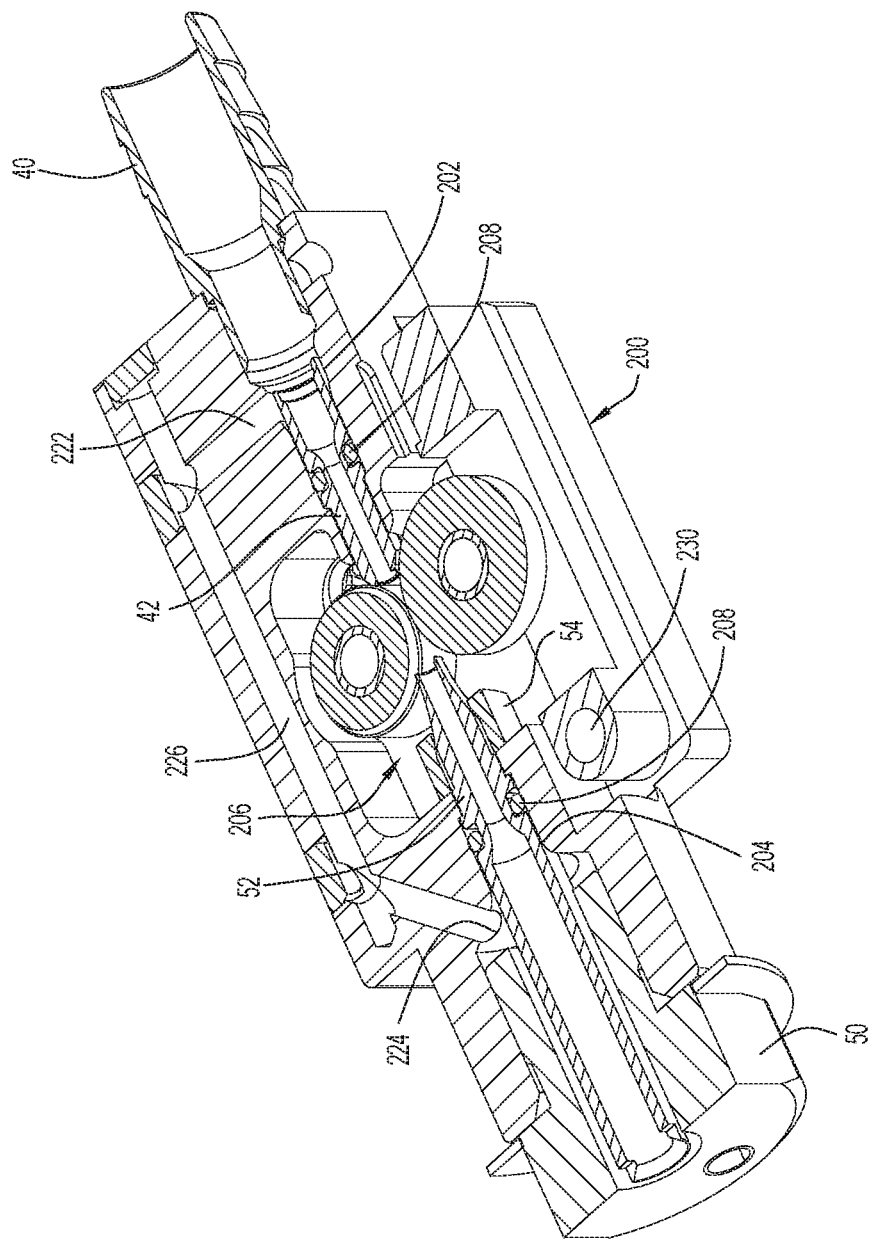
FIG. 4 is a cross-sectional view of the block assembly according to an exemplary embodiment.

Referring to FIG. 4, in some implementations, the drive block assembly 20 may include an inlet ferrule 40, inlet guide 42, outlet ferrule 50, outlet guide 52, and seals 208. The inlet ferrule 40 may be configured to engage the block inlet 202 and portions of the cable 120. A collar 122 may engage the inlet ferrule 40 and portions of the cable 120 (as illustrated in FIG. 1). For example, a plurality of wires extending from the cable 120 may be fastened to the outer surface of the inlet ferrule 40 via the collar 122. In some implementations, the collar 122 may be crimped onto the plurality of wires and inlet ferrule 40. A flow of gas from the cable 120 and weld filler material may pass through the inlet ferrule 40 to the inlet guide 42.

The inlet guide 42 may be disposed at the inlet 202 of the drive block 200 and extend into the central portion 206 of the drive block 200. The inlet guide 42 may be configured to receive and guide the weld filler material from the inlet ferrule 40 to the drive roller 22 and tension roller 33. For example, the inlet guide 42 may be a cylindrical tube extending from the inlet 202 to the central portion 206 and may have a narrow tip adjacent to the drive roller 22 and tension roller 33. Weld filler material may be guided through an interior of the inlet guide 42 to the drive roller 22 and tension roller 33. In some implementations, the inlet guide 42 may be part of a conduit liner of the cable 120. For example, the conduit liner may extend from the inlet guide 42 through the cable 120 to a cable plug or attachment portion 600. In some implementations, the inlet guide 42 may be held in place by a screw and/or bolt extending from an exterior surface of the block 20 to the inlet guide 42.

The outlet guide 52 may receive the weld filler material from the drive roller 22 and tension roller 33 to a sheath 114. The outlet guide 52 may be disposed at the block outlet 204, extending from the central portion 206 of the drive block 200 through the outlet ferrule 50 to the sheath 114 disposed in the neck 110 of the torch (as illustrated in FIG. 1). For example, the outlet guide 52 may be a cylindrical tube having narrow tip adjacent to the drive roller 22 and tension roller 33. Weld filler material may be guided through an interior of the outlet guide 52 to the sheath. The outlet guide 52 may be coupled to the outlet 204 of the drive block 20 via a nut 210.

Quick Release Tensioner

Figure 5A:
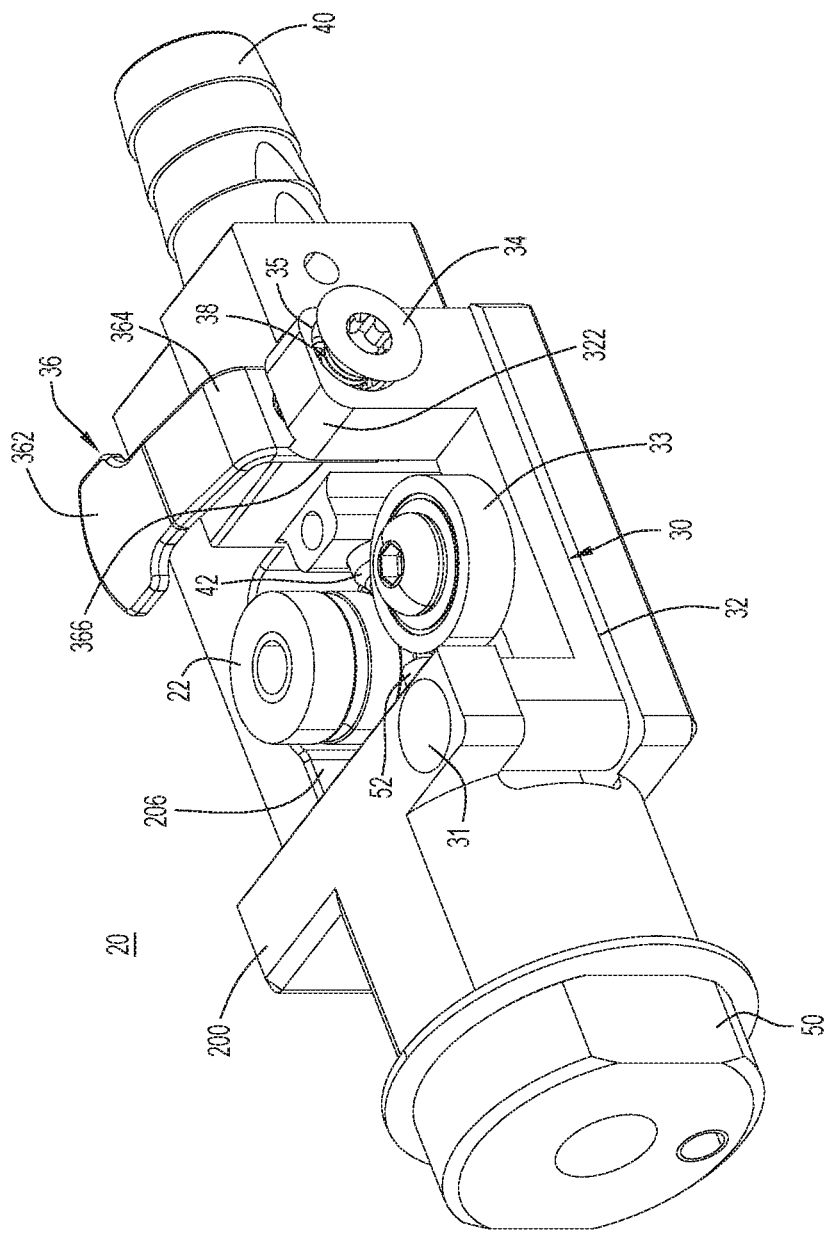
FIG. 5A is a perspective view of the block assembly of FIG. 1.
Figure 5B:
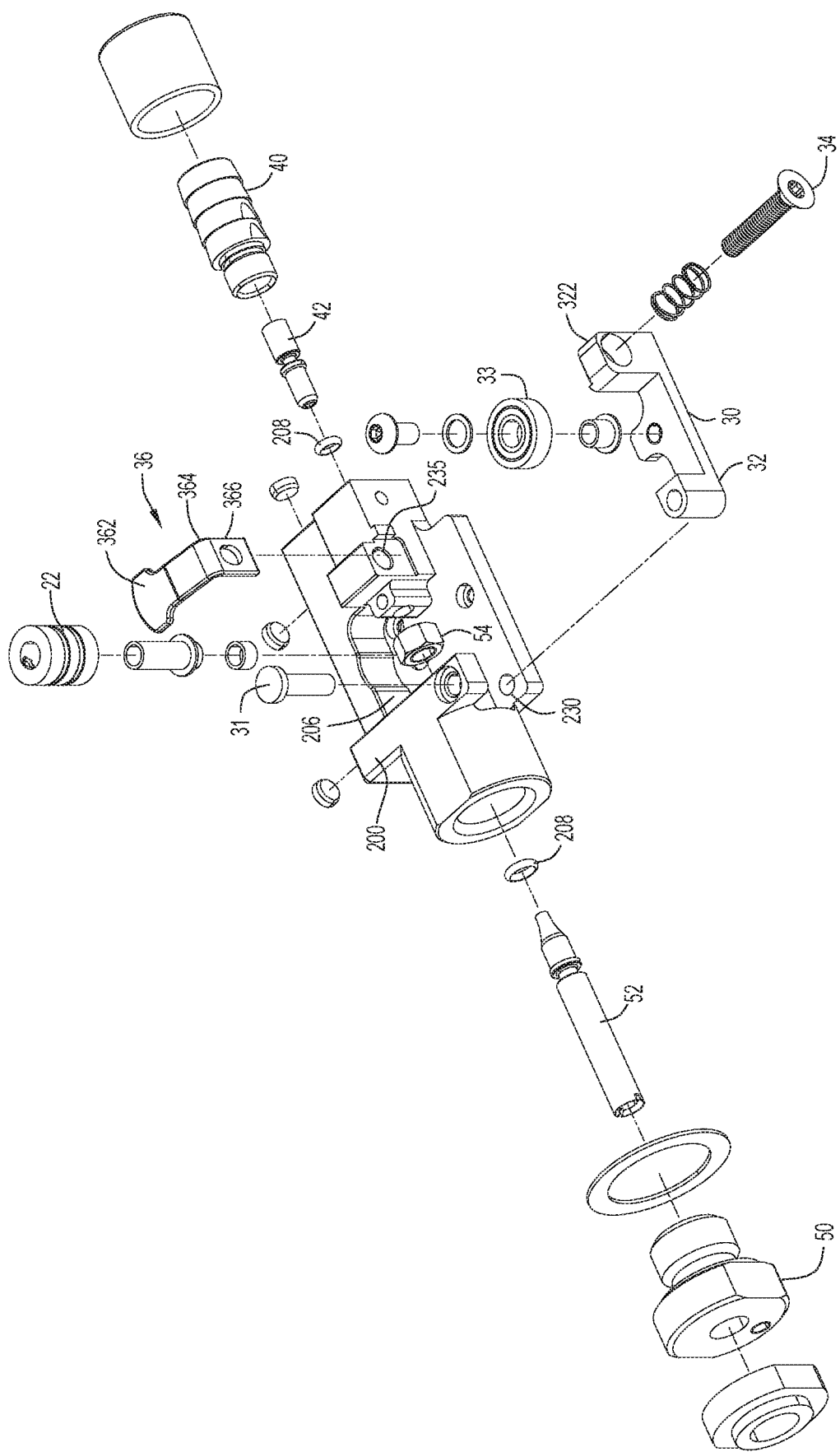
FIG. 5B is a exploded view of the block assembly of FIG. 5A

Referring to FIGS. 5A-5B, according to an exemplary embodiment, a drive block assembly 20 having a quick release tensioner 30 for tensioning a weld filler material and/or drive roller 22 is shown. The drive block assembly 20 may include a drive block 200, drive roller 22, and tensioner 30. The tensioner 30 may include a swing arm 32 having a distal end 322, tension roller 33, lever 36, tensioning fastener 34 (e.g., screw, nut, bolt, etc.), and resilient member 38. The tensioner 30 may be operatively coupled to the drive block assembly 20 via a pivot 31 and the tensioning fastener 34. The tensioner 30 may further include a hole 35 extending through the distal end 322 of the swing arm 32. The resilient member 38 may be disposed in the hole 35 between a head of the tensioning fastener 34 and the distal end 322 of the swing arm 32. For example, a bearing ledge may extend into the hole 35 of the distal end 322 of the swing arm 32. The bearing ledge, may be configured to engage the resilient member 38. The tensioning fastener 34 may extend through the hole 35 of the swing arm 32 and the lever 36, and may engage the drive block 200. For example, the tensioning fastener 34 may be threaded and may engage a blind hole 235 extending into the drive block 200. A thread, formed in the blind hole 235 of the drive block may engage the tensioning fastener 34. The tensioning fastener 34 operatively couples the lever 36, the distal end 322 of the swing arm 32, and the resilient member 38 to the drive block 20. The resilient member 38 may bias the distal end 322 of the swing arm 32 and the lever 36 towards the drive block 20.

The amount of force applied by the resilient member 38 to the distal end 322 of the swing arm 32 and lever 36 may be adjusted by translating the tensioning fastener 34 towards or away from the block assembly 20 (i.e., via rotation of the tensioning fastener 34). For example, the resilient member 38 may be a coil spring and the tensioning fastener 34 may be rotated in a first direction to translate the head of the fastener 34 towards the block assembly 20. The resilient member 38 may be compressed between the head of the tensioning fastener 34 and the swing arm 32. The force from the compressed spring may be applied to the distal end 322 of the swing arm 32. Alternatively, or in addition to, the tensioning fastener 34 may be rotated in a second direction to translate the head of the fastener 34 away from the drive block 200, expanding the resilient member 38 and decreasing the amount of force applied by the resilient member 38 to the distal end 322 of the swing arm 32 as compared to a compressed state of the resilient member 38.

The force from the compressed resilient member 38 may be applied to a distal end 322 of the swing arm 32. The force may cause the swing arm 32 to rotate about the pivot 31 towards a central portion 206 of the drive block 200. The force may be transmitted through the swing arm 32 and the tension roller 33. As a result, the tension roller 33 may apply a tensioning force to a weld filler material disposed between the tension roller 33 and the drive roller 22, and/or the drive roller 22 in response to the force being applied by the resilient member 38. The tension roller 33 and drive roller 22 may cooperate to apply a force to a weld filler material, e.g., weld wire or weld strip, disposed between the tensioning roller 33 and the drive roller 22. Rotation of the drive roller 22 by the motor 104 may cause the tension roller 33 to rotate due to engagement with the drive roller 22. The rotating drive roller 22 and tension roller 33 may cooperate to pull the weld filler material.

The lever 36 of the quick release tensioner 30 may have an angled body. The angled body may include a first portion 362, and angled portion 364, and a bearing portion 366. The first portion 362 and the bearing portion 366 are substantially straight, and are coupled to each other via the angled portion 364 at an angle. For example, the angle may be about 80°-110°, preferably 100°. In some implementations, the lever 36 may be formed from a unitary body. For example, the angled body of the lever 36 may be formed from a straight strip of material by bending the strip about the central region of the strip, thereby defining a first portion 362, an angled portion 364, and a bearing portion 366. The bearing portion 366 may disposed between the block assembly 20 and distal end 322 of the swing arm 32. The tensioning screw 34 may pass through both the distal end 322 of the sing arm 32 and the lever arm 36. The resilient member 38 may apply a force against the tensioning screw 34 and the distal end 322 of the swing arm 32. The distal end 322 of the swing arm 32 may bear against the bearing portion 366 of the lever 36 and transmit the force applied by the resilient member 38 to the lever 36.

In some implementations, the drive roller 22 may have first and second grooves spaced axially along the longitudinal axis of the drive roller 22. The spaced grooves may enable reorientation or reconfiguration of the drive roller 22 when one groove becomes overly worn. During a welding operation, the first groove may engage a weld filler material, where, over time, the first groove may become worn, for example. Once the first groove is worn, the drive roller 22 may be adjusted by rotating the drive roller 22 about a radial axis (e.g., the drive roller 22 is flipped over) so that the second groove may be aligned with the weld filler material. Alternatively, or in addition to, the worn drive roller may be removed and replaced with a new drive roller when both grooves become worn. In some embodiments, the grooves of the drive roller 22 may accommodate or be configured to receive different gauges of weld filler material. For example, the first groove of the drive roller 22 may be sized for a first gauge of a weld filler material, and the second groove may be sized for a second gauge of weld filler material. This enables the drive roller 22 to be oriented within the torch body 101 based on the gauge of the weld filler material used.

In some implementations, the drive roller 22 may have a knurled surface. The driver roller 22 may be reoriented or reconfigured when the knurled surface becomes overly worn. During a welding operation, a first portion of the knurled drive roller 22 may engage a weld filler material, where, over time, the first portion may become worn, for example. Once the first portion is worn, the drive roller 22 may be adjusted by rotating the drive roller 22 about a radial axis (e.g., the drive roller 22 is flipped over) so that a second portion may be aligned with the weld filler material.

In some implementations, the tension roller 33 may have a groove to accommodate or receive weld filler material. The groove of the tension roller 33 may be configured to accommodate a size for a first gauge of a weld filler material.

With the drive roller 22 in place, a user may set a predetermined/desired force (tension force) applied by the tension roller 33 to the drive roller 22 and/or weld filler material by adjusting the tensioning screw 34. The lever 36 may displace the swing arm 32 and release the set tension force applied by the tension roller 33 to the drive roller 22 and/or weld filler material. For example, a user may open the access port 112 (as illustrated in FIG. 1) to expose the block assembly 20 and quick release tensioner 30. The user may apply a force on the first portion 362 of the lever 36 toward the block assembly 20, causing the swing arm 32 to rotate about the pivot 31. The pivoting of the swing arm 32 may cause the tension roller 33 to translate away from the drive roller 22 to an open state. The user may release the first portion 362 of the lever to cause swing arm 32 to rotate towards the drive block 200 and the tension roller 33 to translate towards the drive roller 22 to a closed state. In the closed state, the tension roller 33 may apply the predetermined/desired force to the drive roller 22 and/or weld filler material without further adjustment of the tensioning fastener 34.

For example, pressing the first portion 362 of the lever 36 towards the block 200, the lever 36 may pivot about the angled portion 364. The rotation of the lever may cause the bearing portion 366 to translate away from the block 200 and may push against the distal end 322 of swing arm 32. The push force from the bearing portion 366 to the distal end 322 of the swing arm 32 may overcome the force applied by the resilient member 38. Accordingly, the resilient member 38 may compress and the distal end 322 of the swing arm 32 may translate away from block 200. In response to the distal end 322 of the swing arm 32 translating away from the block 200, the swing arm 32 may rotate about the pivot 31 thereby translating the tension roller 33 away from the drive roller 22. In the open state with the lever 36 depressed and the tension roller 33 disengaged from the drive roller 22, weld filler material and/or the drive roller 22 may be loaded and/or removed/adjusted. After threading weld filler material through the block 200 and/or replacing/adjusting a drive roller 22, the user may release the lever 36. The resilient member 38 may cause the swing arm 32 and tension roller 33 to translate back towards the block 200. In the closed state, the tension roller 33 may engage the weld filler material and/or drive roller 22 with the desired or predetermined force. That is, the quick release tensioner 30 may allow reengagement of the tension roller 33 at the predetermined tension force to a weld filler material and/or the drive roller 22 without a separate tool.

For example, during operation, the user may set a predetermined/desired force to be applied by the tension roller 33 to the drive roller 22 and/or weld filler material, depress the lever 36 to disengage the tension roller 33, replace the drive roller 22 and/or load weld filler material into the block assembly 20 and release the lever 36. In response to releasing the lever 36, the tension roller 33 may engage the weld filler material and/or drive roller 22 with the same predetermined/desired force without adjusting the tensioning fastener 34.

Gas Passageway

Continuing with FIGS. 4 and 5, in some implementations, the drive block 200 may include a gas passageway 220 for guiding a flow of gas received in the block inlet 202 from the cable 120 around the central portion 206 to the block outlet 204. The gas passageway 220 may include an inlet channel 222, a bypass channel 226, and an outlet channel 224. The inlet channel 222 may extend radially from the block inlet 202 towards a lateral edge of the drive block 200. The bypass channel 226 may extend in a longitudinal direction of the drive block 200 along the lateral edge. The inlet channel 222 may fluidly connect to the bypass channel 226 and block inlet 202. The outlet channel 224 may extend from the block outlet 204 to the bypass channel 226. Accordingly, the outlet channel 224 may be fluidly coupled to the bypass channel 226 and block outlet 204.

During operation, the flow of gas from the cable 120 may flow through the block inlet 202, into the channel inlet 222, through the bypass channel 226, and to the outlet channel 224. The flow of gas from the outlet channel 224 may enter the block outlet 204. Accordingly, the flow of gas bypasses the central portion 206 of the drive block assembly 20.

In some implantations, seals 208 may prevent a flow gas received from the cable 120 from entering the central portion 206 of the drive block. For example, one seal 208 may be disposed between the inlet guide 42 and inlet 202 of the drive block 200 and another seal 208 may be disposed between the outlet guide 52 and outlet 204 of the drive block 20. In some implementations, the inlet 202 and outlet 204 may include circumferentially extending grooves configured to receive the seals 208. For example, the seals may engage the grooves of the block inlet 202 and block outlet 204 and an outer surface of the inlet guide 42 and outlet guide 52, respectively. Accordingly, a flow of gas from the cable, received at the inlet 202, may be prevented from flowing into the central portion 206 of the drive block 22 and diverted through the gas passageway 220.

The weld filler material may further be isolated from the gas after leaving the central portion 206 of the drive block 200. The outlet guide 52 may extend to the sheath 114 disposed in the torch neck 110, and isolate the weld filler material from the flow of gas as the weld filler material travels from the drive roller 22 and tension roller 33 to the sheath 114 (as illustrated in FIG. 1). For example, after leaving the drive and tension rollers 22, 33, the weld filler material may travel through an interior of the outlet guide 52 to an interior of the sheath 114. The flow of gas may exit the outlet channel 224 into the block outlet 204, but outside of the outlet guide 52 and sheath 114. The flow of gas may travel between an interior surface of the torch neck 110 and exterior surface of the sheath 114 to a diffuser 116. Accordingly, the sheath 114 may further isolate the weld filler material from the gas as the weld filler material travels through the sheath 110 to the diffuser 116. The flow of gas may pass through the diffuser 116 to the nozzle 108 and around the contact tip 109.

In some implementations, the sheath 114 may be a flexible, low-friction material. For example, the sheath 114 may be formed from Polytetrafluoroethylene (PTFE) or Teflon. In some implementations the inlet guide 42 and outlet guide 52 may be formed from a high temperature plastic. For example, the inlet guide 42 and outlet guide 52 may be formed from polyaryletherketone (PAEK), polyoxymethylene (Acetal), Polyetheretherketone (PEEK), Vespel, Torlon, or any other high temperature resistant material. In some implementations the inlet guide 42 may be formed from a metal. For example, the inlet guide 42 may be formed from brass, copper, other metal alloy.

Cable

Figure 6:
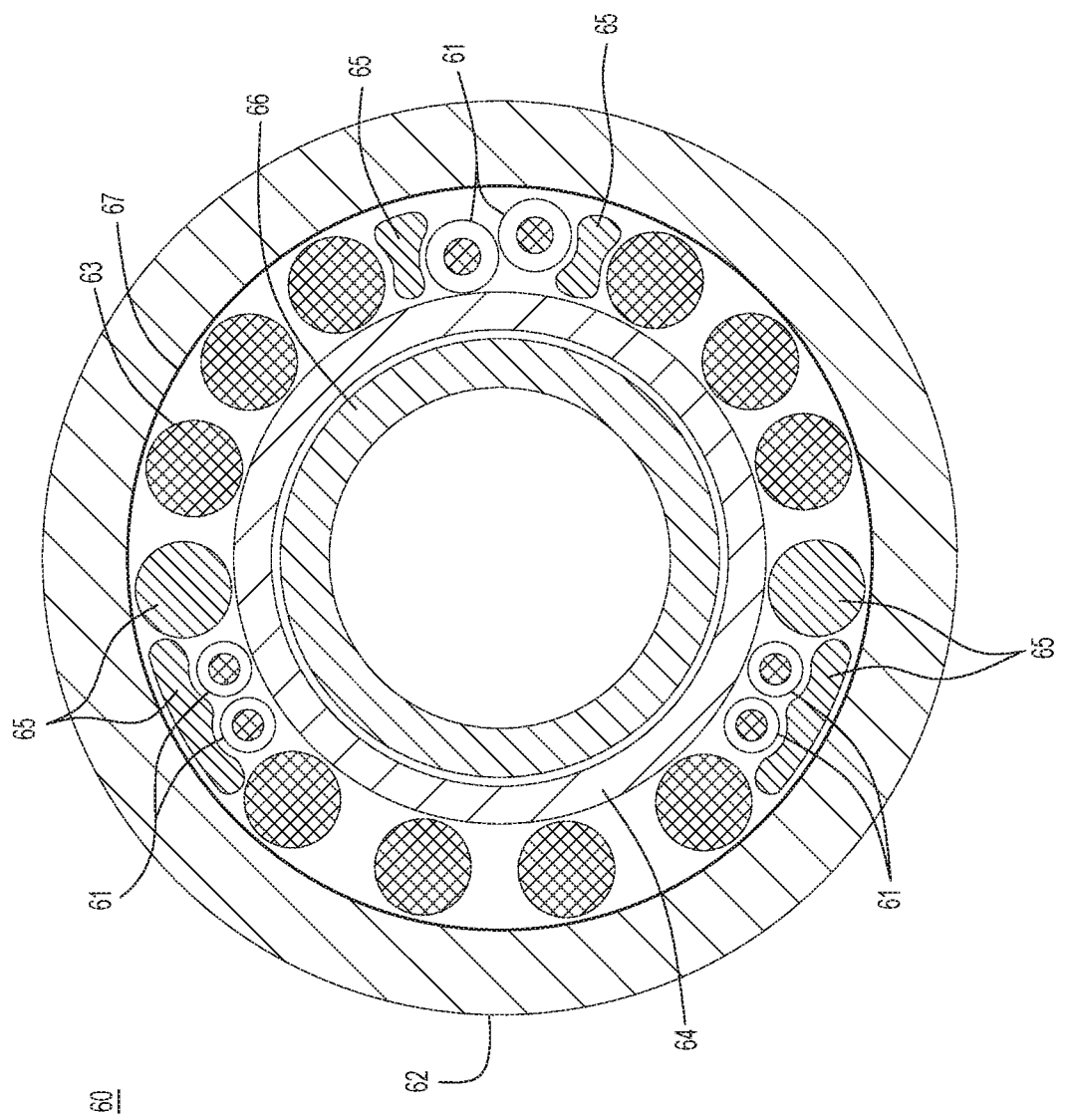
FIG. 6 is a cross-sectional view of the cable assembly according to an exemplary embodiment.
Figure 7:
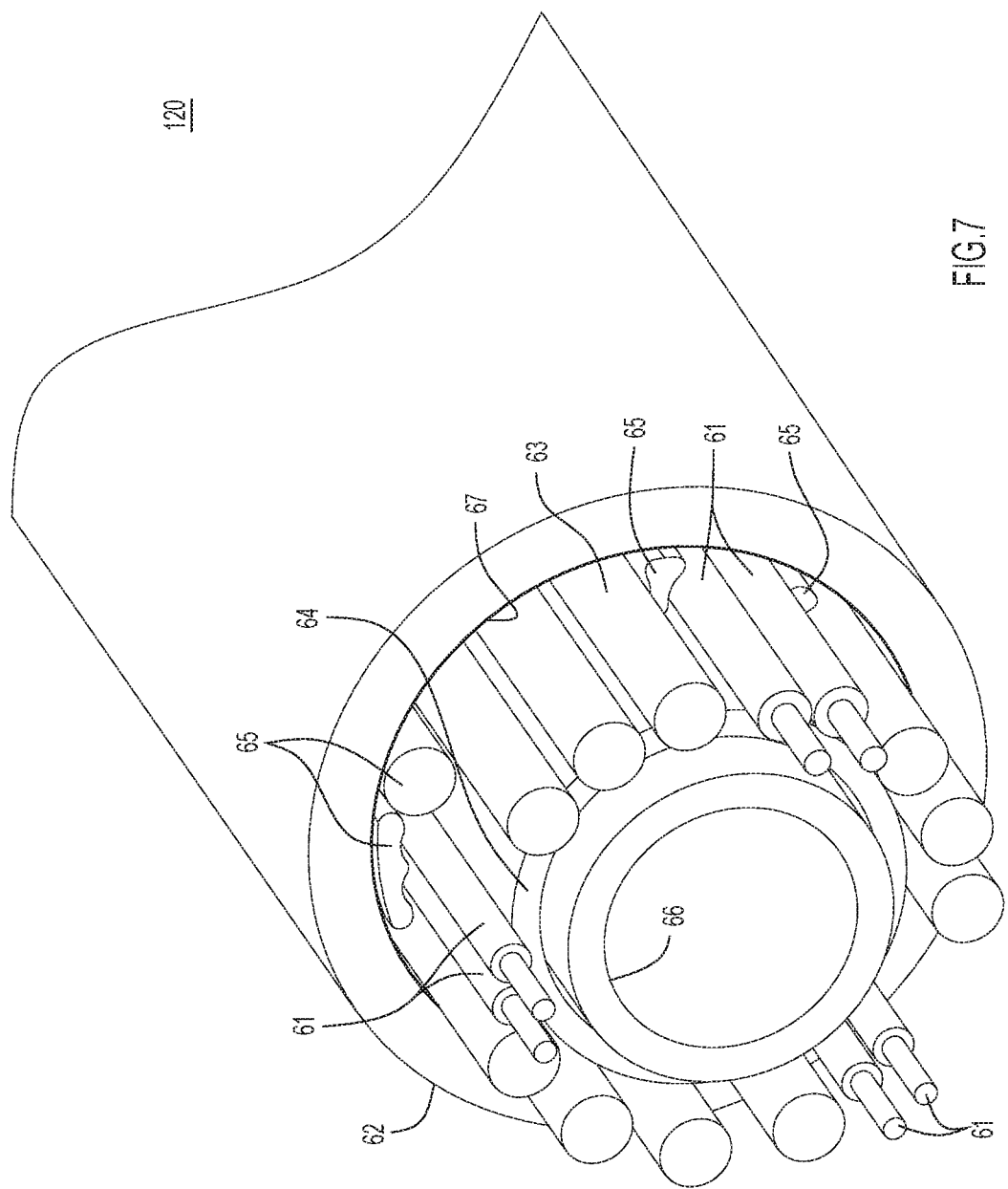
FIG. 7 is a perspective view of the cable assembly of FIG. 6.

Referring to FIGS. 6 and 7 cross-sectional and prospective views of a torch cable 120 is shown. The torch cable 120 illustrated in FIGS. 6 and 7 may be representative of cable 120 discussed above with reference to FIGS. 1-5, however, embodiments are not limited thereto. Cable 120 is configured to transmit weld current, weld filler material, and gas from a power source and/or feeder to a torch. Cable 120 may be further configured to transmit data and/or control signals between the torch, a wire feeder, and/or a power source.

Cable 120 may include control lead or wires 61, and extruded outer jacket 62, copper wires 63, and a metal core tube 66. An outer jacket 62 may be surround the metal core tube 66, rubber extrusion 64, control leads 61, and copper wire 63. The metal core tube 66 may be disposed at the center of the cable 120. The metal core tube 66 may be configured to guide weld filler material and a flow of gas through the cable 120. The metal core tube 66 may be covered with a rubber extrusion 64. The control leads 61 may extend along the length of the cable 120 and may be arranged about an outer circumference of the metal core tube 66. The control leads 61 may configured to transmit data and/or control signals between the connected devices. For example, six control leads 61 may transmit data and/or control signals between a torch, a wire feeder, and a power source. The copper wires 63 may extend along the length of the cable 120 and may be arranged about an outer circumference of the metal core tube 66. The copper wires 63 may be configured to transmit a weld current. For example, during operation, a weld current may flow through the copper wires 63 to a torch. Filler material 65 may be disposed between the control leads 61, copper wires 63, and between the rubber extrusion 64 and outer jacket 62. The control leads 61, copper wires 63, and filler material 65, may be wrapped in a cloth wrap 67 disposed about the inner surface of the outer jacket 62. The outer jacket 62 may surround the metal core tube 66, rubber extrusion 64, control leads 61, copper wire 63, filler material 65, and cloth wrap 67.

In some implementations of the cable 120, the copper wires 63 may extend past a distal end of the cable 120, into the attachment portion 106 of the torch and engage the inlet ferrule 40 and collar 122 (illustrated in FIG. 1). In some implementations, the metal core 66 extends past the distal end of the cable 120 into the attachment portion 106 of the torch and into the inlet ferrule 40.

Cable Attachment

Figure 8A:
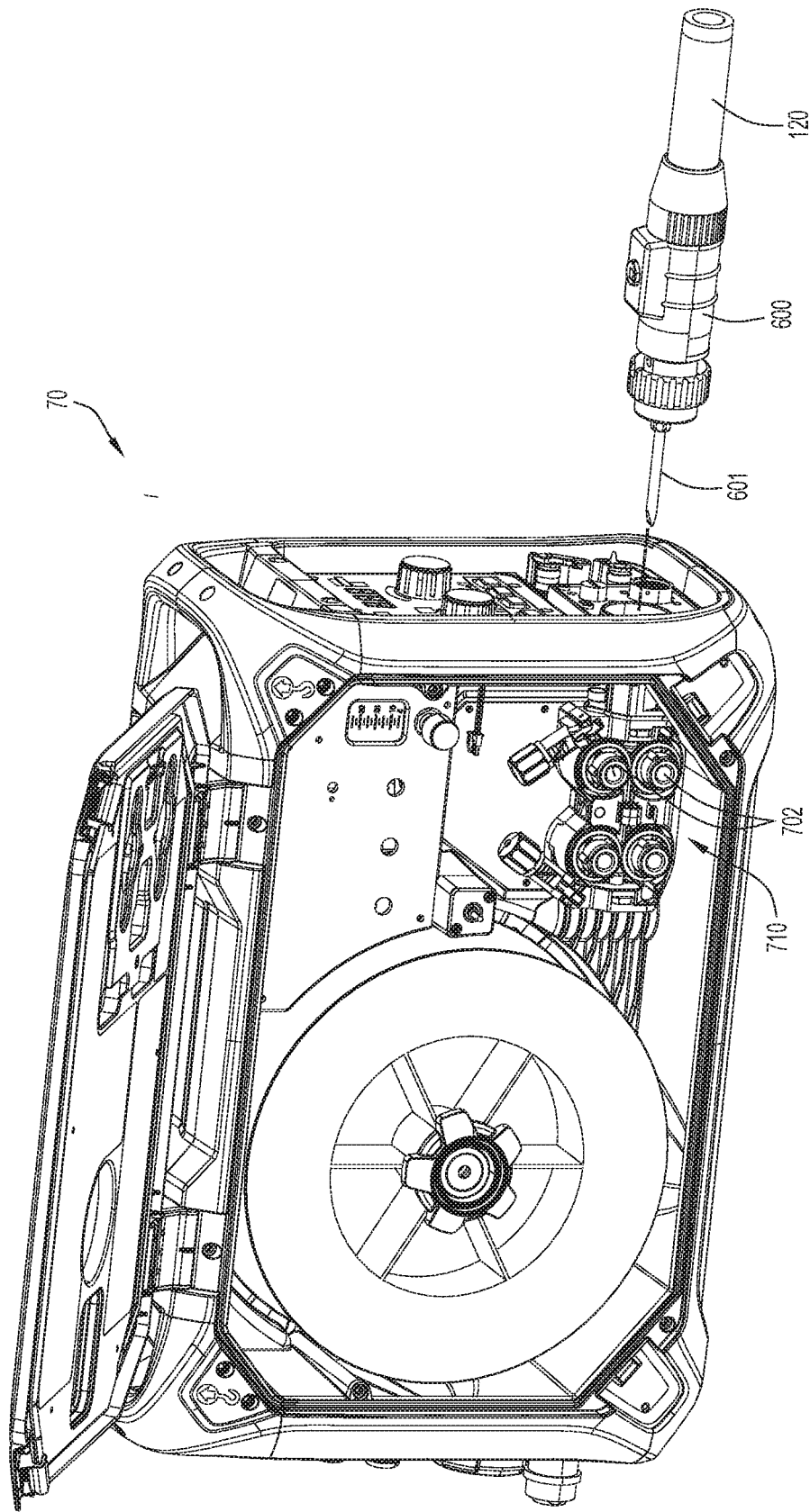
FIGS. 8A and 8B are perspective views of the cable attachment portion and wire feeder, according to an exemplary embodiment.
Figure 8B:
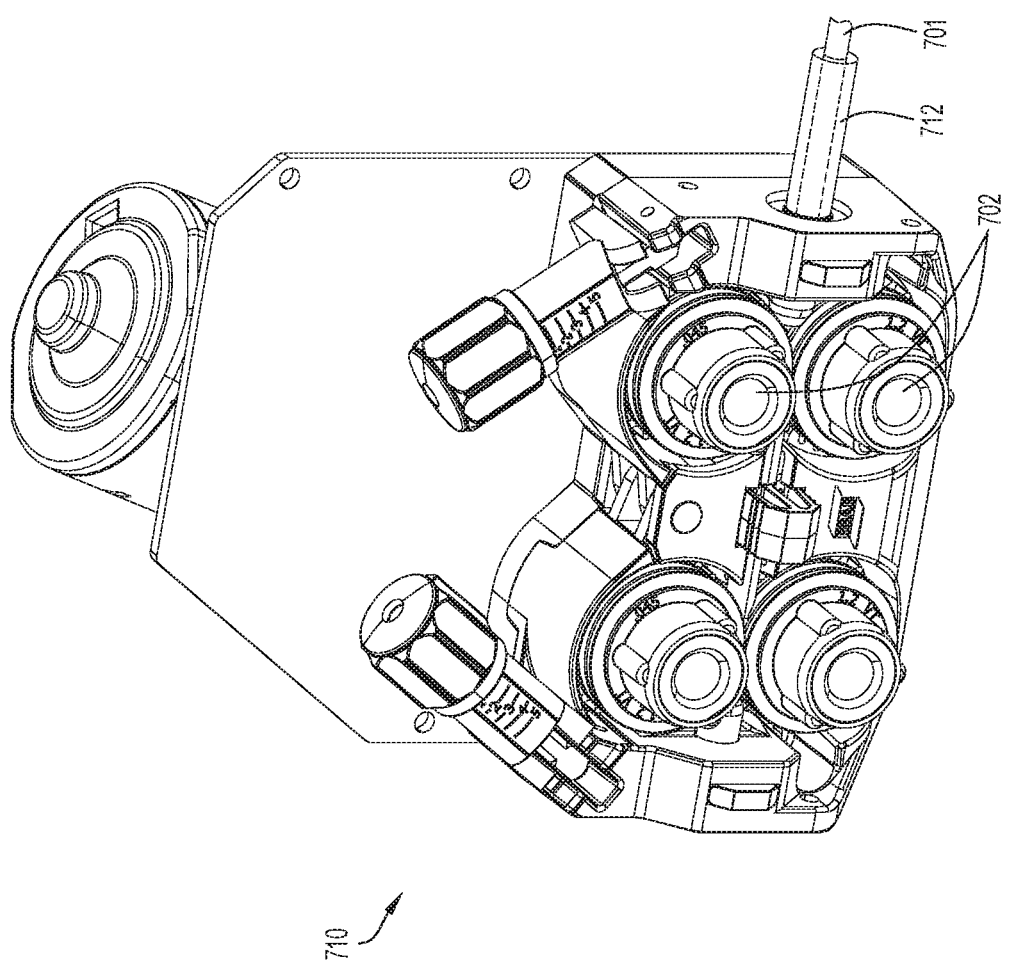

Referring to FIGS. 8A-8B, a proximal end of the cable 120 with an attachment portion 600 and wire feeder 70 are shown. The attachment portion 600 is configured to attach to a socket 700 of the wire feeder 70. The attachment portion 600 may include a feeder wire guide 601 configured extend through the socket 700 to drive rollers 702 of a wire feeder mechanism 710 disposed within the wire feeder 70. For example, the feeder wire guide 601 may be a cylindrical tube extending from the cable attachment portion 600 with a tapered distal end. When the cable attachment portion 600 is inserted into the socket 700 of the wire feeder 70, the tapered distal end of the feeder wire guide 601 extends through the socket 700, into a wire guide tube 712 of the wire feeder mechanism 710, and to the drive rollers 702 (see FIG. 8B). During operation, the feeder wire guide 601 receives weld filler material from the rollers 702. Due to the proximity of the distal end of the feeder guide 601 to the drive rollers 702, jamming or bird nesting of weld filler material between the drive rollers 702 and socket 700 may be avoided or reduced.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the torch, the block assembly, and cable/hose assembly as described herein, or portions thereof may be fabricated from any suitable material or combination of materials, such as plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Finally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

What is claimed is:

1. A welding torch comprising:
   a torch body;

a unitary block disposed in the torch body, the unitary block comprising:
   a block inlet;
   a block outlet, the block inlet and the block outlet configured to receive a weld filler material;
   a gas channel fluidly connected to the block inlet and the block outlet; and
   a central portion disposed between the block inlet and the block outlet, the central portion configured to receive and at least partially support a drive roller, wherein the gas channel bypasses the central portion by extending through a portion of the unitary block between a side of the unitary block and the central portion; and
a quick release tensioner assembly comprising:
   a swing arm disposed on the unitary block via a pivot, the swing arm configured to rotate about the pivot in response to a force applied to a lever having a first portion and a bearing portion, the bearing portion disposed between the swing arm and the unitary block and adjacent to a hole of the unitary block when the swing arm is disposed on the unitary block in a non-released state;
   a fastener extending through the swing arm and the bearing portion to engage the hole of the unitary block; and
   a resilient member configured to bias the swing arm towards the unitary block.

2. The torch of claim 1, further comprising the drive roller disposed in the central portion of the unitary block.

3. The torch of claim 2, further comprising a tension roller disposed at the unitary block.

4. The torch of claim 3, wherein the tension roller is operatively coupled to the swing arm.

5. The torch of claim 4, further comprising the lever, wherein the lever is movably coupled to the unitary block.

6. The torch of claim 4, wherein the swing arm is configured to apply a force through the tension roller to the weld filler material and the drive roller,
   wherein the drive roller and the tension roller are configured to pull the weld filler material through the block inlet.

7. The torch of claim 1, wherein the torch body further comprises a cable attachment portion, the cable attachment portion is angled with respect to the unitary block.

8. The torch of claim 7, wherein the cable attachment portion comprises a ball and socket style joint configured to receive a cable.

9. A quick release tensioner assembly for a welding torch comprising:
   a swing arm configured to mount to a drive block assembly via a pivot;
   a lever having a first portion and a bearing portion extending from the first portion at an angle, the bearing portion disposed between the swing arm and the drive block assembly when the quick release tensioner assembly is mounted to the drive block assembly;
   a fastener having a first end and a second end, the fastener disposed through the swing arm and the bearing portion, the first end of the fastener configured to engage the drive block assembly when the quick release tensioner assembly is mounted to the drive block assembly; and
   a resilient member configured to bear against the second end of the fastener and the swing arm.

10. The assembly of claim 9, wherein the resilient member is configured to apply a biasing force to the swing arm that biases the swing arm towards the drive block assembly when the quick release tensioner assembly is mounted to the drive block assembly.

11. The assembly of claim 10, wherein the fastener is configured to translate relative to the drive block assembly.

12. The assembly of claim 11, wherein moving the fastener adjusts an amount of biasing force applied by the resilient member to the swing arm.

13. The assembly of claim 11, wherein the lever is configured to overcome the biasing force applied by the resilient member in response to the lever being pressed towards the drive block assembly.

14. The assembly of claim 13, wherein the swing arm is configured to swing away from the drive block assembly about the pivot in response to the lever being pressed towards the drive block assembly.

15. The assembly of claim 9, further comprising a tension roller disposed on the swing arm.

16. The assembly of claim 15, wherein the drive block assembly comprises a drive roller, and wherein the tension roller is biased towards the drive roller via the swing arm.

17. The assembly of claim 16, wherein the drive roller and the tension roller are configured to receive a weld filler material.

18. The assembly of claim 9, wherein the drive block assembly is a unitary block.

19. A quick release tensioner assembly for a welding torch comprising:
   a swing arm configured to mount to a drive block assembly via a pivot and rotate about the pivot in response to a force applied to a lever having a first portion and a bearing portion, the bearing portion disposed between the swing arm and the drive block assembly and adjacent to a hole of the drive block assembly when the swing arm is mounted to the drive block assembly in a non-released state;
   a fastener disposed through the swing arm and the bearing portion, the fastener configured to engage the hole of the drive block assembly when the quick release tensioner assembly is mounted to the drive block assembly; and
   a resilient member configured to bias the swing arm towards the drive block assembly.

20. The quick release tensioner assembly of claim 19, further comprising the drive block assembly, wherein the drive block assembly is a unitary block.

* * * * *